UNITED STATES PATENT OFFICE.

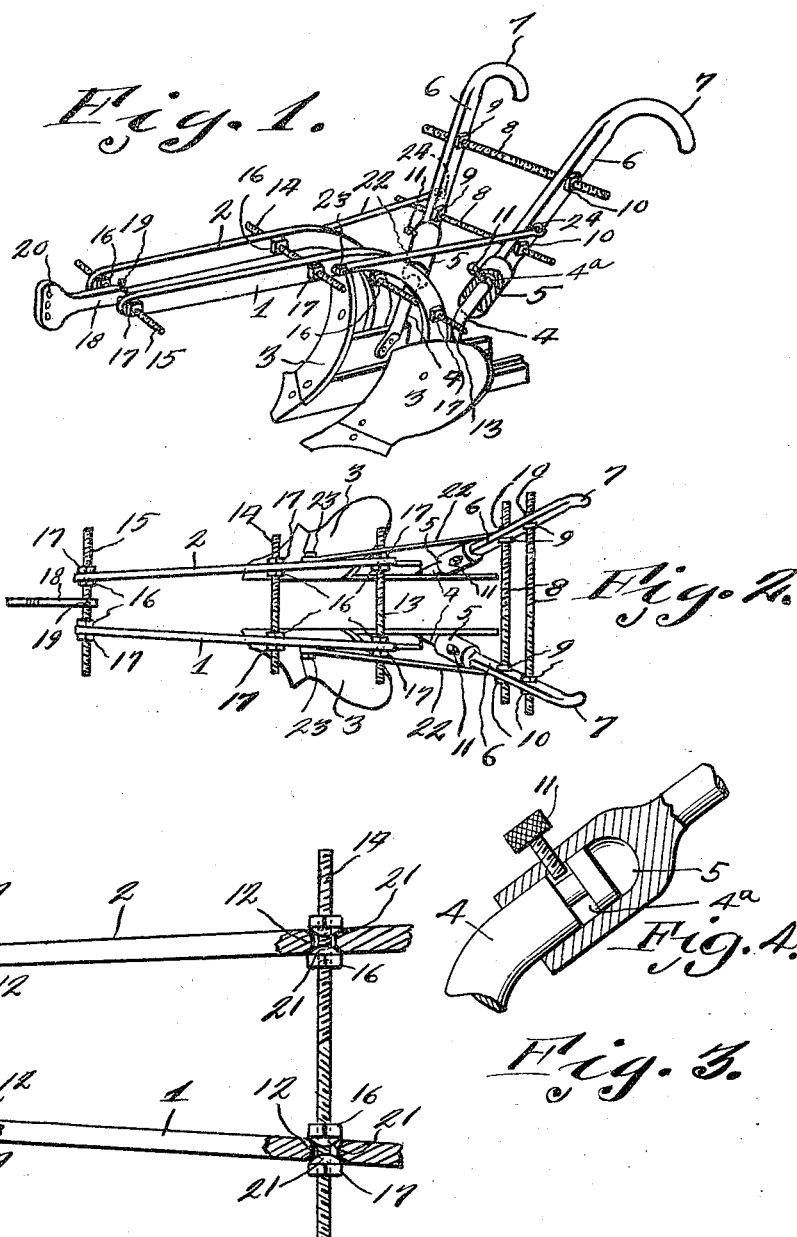

GEORGE RAUN, OF HAHN, TEXAS.

FARMING IMPLEMENT.

1,303,961.      Specification of Letters Patent.      Patented May 20, 1919.

Application filed June 4, 1917. Serial No. 172,814.

*To all whom it may concern:*

Be it known that I, GEORGE RAUN, a citizen of the United States, residing at Hahn, in the county of Wharton, State of Texas, have invented a new and useful Farming Implement; and I do hereby declare the following to be a full, clear, and exact description of the invention, such as will enable others skilled in the art to which it appertains to make and use the same.

This invention relates to an improved farming implement of the ground breaking type, and one of the objects of the invention is provide a device of this kind comprising a pair of plows, which may be adjusted toward and from each other, either in parallelism or at angles to one another, whereby the ground may be plowed upon both sides of a row of crop.

A further object of the invention is to provide a double plow, which, when said plows are adjusted toward and adjacent each other, the device may be utilized as a lister or as a middle breaker.

A further object of the invention is the provision of means for adjustably connecting said plows and their handles.

A further object of the invention is the provision of means for swiveling the handles to the plows, whereby the handles may be arranged at a certain spaced interval and the plow beams and the plows are capable of being adjusted at angles toward or from each other at either end of the implement.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view in perspective of the improved farming implement, constructed in accordance with the invention.

Fig. 2 is a plan view.

Fig. 3 is a plan view, and partly in section, of the plow beams, showing the adjustable connections between the beams, whereby they can be adjusted toward and from each other.

Fig. 4 is an enlarged sectional view of one of the swivel joints.

Referring more especially to the drawings, 1 and 2 designate plow beams to the lower ends of the rear curved portions of which the usual plows 3 are attached. The rear parts of the plows are provided with upwardly and rearwardly extending arms 4, which are secured swivelly in the tubular parts 5 of the handle beams 6, which have handles 7. Right and left threaded rods extend transversely of and are adjustably connected to the handle beams. Nuts 9 and 10 are threaded on said rods 8 adjacent the inner and outer portions of the handle beam, so that by adjusting said nuts, the handle beams may be adjusted toward and from each other. By means of the screw bolts 11, the arms 4 are swivelly mounted in said tubular parts of the handle beam. It is to be readily understood that said handle beams 6 do not require swivel movements when they are used that is when the handles 7 are gripped and the plow guided. However, on the other hand a swivel action is necessary when adjusting the handle beams toward and from each other when adjusting the plow toward and from each other, as will be hereinafter explained. In order to provide a swivel joint between the arms 4 and the tubular parts 5 (radially through which the screw bolts 11 extend), the arms 4 are provided with annular grooves 4ª, as clearly shown in Fig. 4. The screw bolts 11 extend just sufficiently into the grooves to prevent longitudinal movement of the arms 4 and the tubular parts 5, and allow the arms 4 to swivel or rotate in the tubular parts 5, as shown in Fig. 4. In other words the screw bolts do not contact with the bottoms of the grooves. The openings in the handle beams through which the rods 8 extend are of the same shape as those openings shown in the beams 1 and 2 in Fig. 3, whereby the rods 8 may be adjusted at slight angles through the handle beam.

Extending transversely through the plow beams 1 and 2 and engaging the openings 12 of said beams are right and left threaded rods 13, 14 and 15, there being nuts 16 and 17 threaded on said rods adjacent the inner and outer faces of said plow beam, whereby said plow beams may be adjusted toward and from each other, or at angles to one another. A suitable draft device 18 is secured by a set screw 19 on the rod 15, and its enlarged flat end portion is provided with a series of openings 20, any one of which may be engaged by a conventional form of clevis (not shown) so that an equalizer (not shown) to which draft animals may be attached may be connected to the implement. It is to be observed that the openings 12 in the plow beams are slightly larger than the rods, so that said rods may extend at angles through the plow beams. Furthermore, the inner surfaces of the nuts 17, as indicated in Fig. 3 are convexed, as shown at 21, so as to partly protrude into the openings 12, in order to more securely hold the parts together. Suitable brace rods 22 are connected by bolts 23 to the outer faces of the plow beams 1 and 2, and the rear ends of said braces are connected to eyes 24 of the handle beams, thereby bracing the handle beams relative to the plow beams. By means of the adjustable rods 13, 14 and 15, the forward ends of the plow beams may be adjusted close together, while their rear ends may be separated considerably, so as to hold the plows at angles to each other. Also, the rear ends of the plow beams may be adjusted closer together than the forward ends, so as to hold the plows at different angles to each other. When adjusting the plows in the last named manner, it is necessary to adjust the handle beams accordingly. If desired, the plows may be adjusted, so as to engage each other, thereby providing a middle breaker. Very often the forward ends of the plow beams 1 and 2 may be adjusted comparatively close, and the rear portions of the beams considerably separated. When considerably separating the rear parts of the plow beams 1 and 2, without disturbing the very close position of the forward ends of said beams, the adjacent faces of the handle beams if made rigid with the parts 4 should assume different angles to each other, than when close together. This same rule applies when adjusting the forward ends of the beams 1 and 2 farther apart than the rear end, consequently it has been found necessary to apply adjustable swiveled joints between the handle beams 6 and the arms 4.

The invention having been set forth, what is claimed as new and useful is:—

1. In a farming implement, a pair of plows, handles swivelly connected thereto, a pair of plow beams on which the plows are mounted, bracing means between the handles and the plow beams, and similar adjusting means connecting the handles and connecting the plow beams, whereby the plows may be adjusted apart at different angles or close together, thereby converting the implement into a middle breaker.

2. In a farming implement, a pair of plow beams having rearwardly and downwardly curved plow standards, plows mounted upon said standard having their land sides facing each other and having upwardly and rearwardly extending arms, adjustable means connecting the corresponding forward ends of said beams and said standards respectively whereby the beams may be adjusted in parallelism toward and from each other and whereby the standards may be separated or brought together more than the forward ends of said beams and vice versa, handle beams having swiveled joints with said arms, whereby the adjacent faces of the handle beams may assume proper angles relative to each other when adjusting the plow beams, right and left threaded rods connecting the handle beams and provided with nuts engaging opposite faces of the handle beams respectively, and bracing links connecting the handle beams and the plow beams for reinforcing the structure.

In testimony whereof I have signed my name to this specification in the presence of two subscribing witnesses.

GEORGE RAUN.

Witnesses:
L. O. LUNDY,
F. M. BRUNS.

Copies of this patent may be obtained for five cents each, by addressing the "Commissioner of Patents, Washington, D. C."